Nov. 20, 1934.   H. G. FRANCIS   1,981,499
CLAMP
Filed May 11, 1929   4 Sheets-Sheet 1
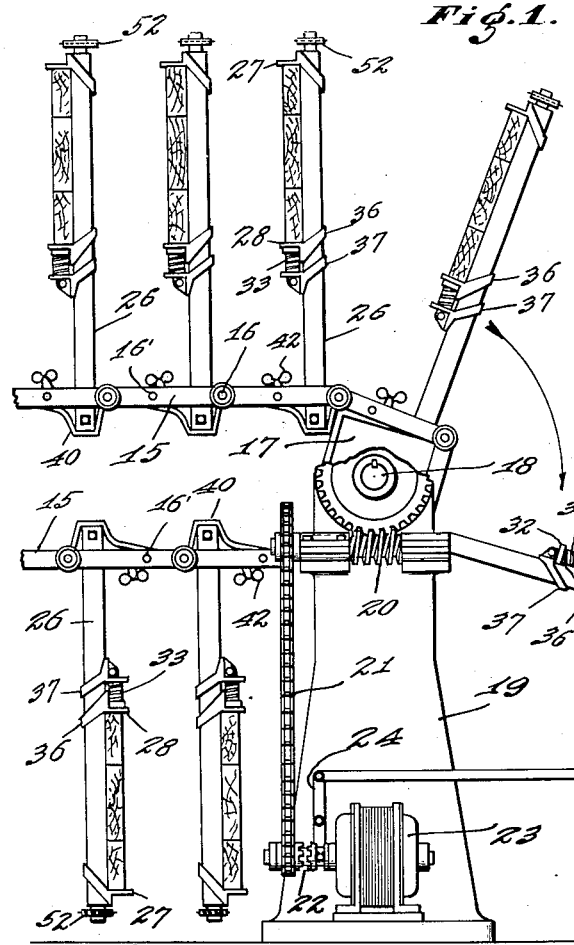
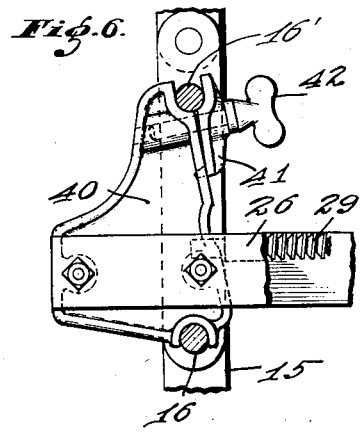
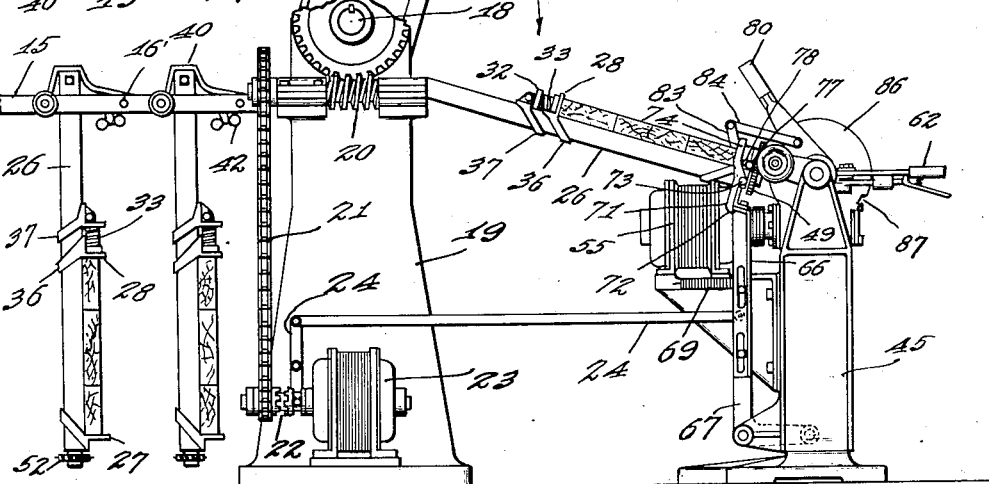
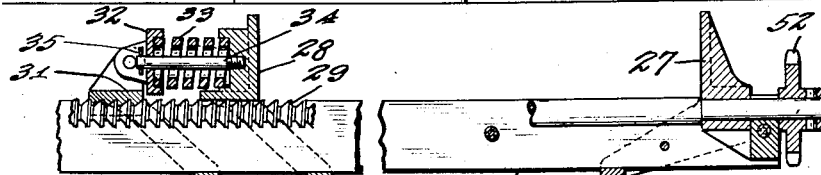
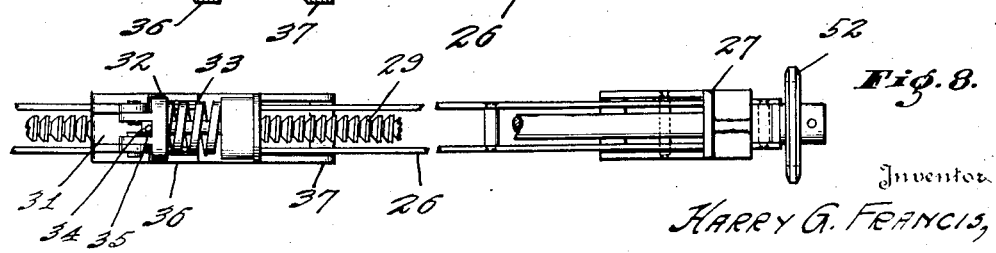
Inventor
HARRY G. FRANCIS,
By
Attorneys

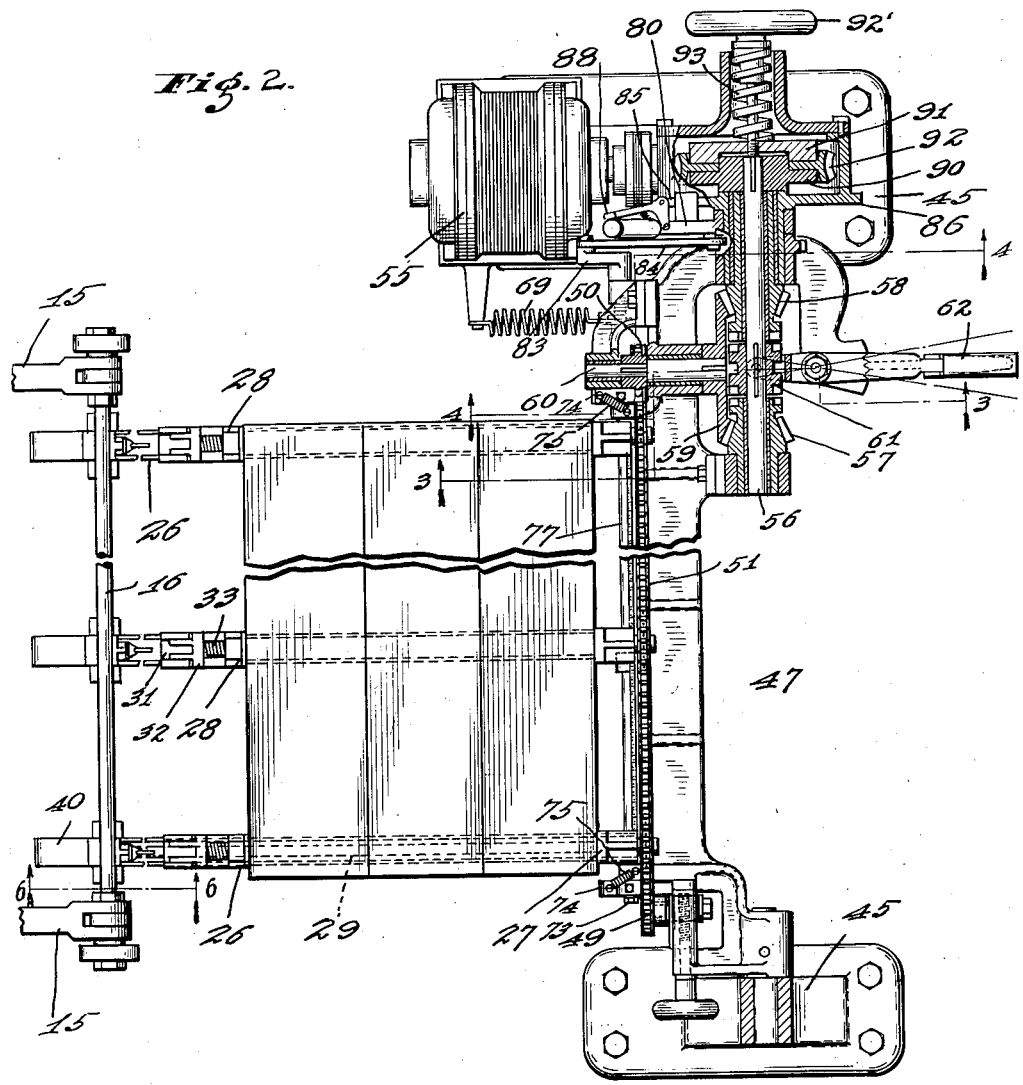

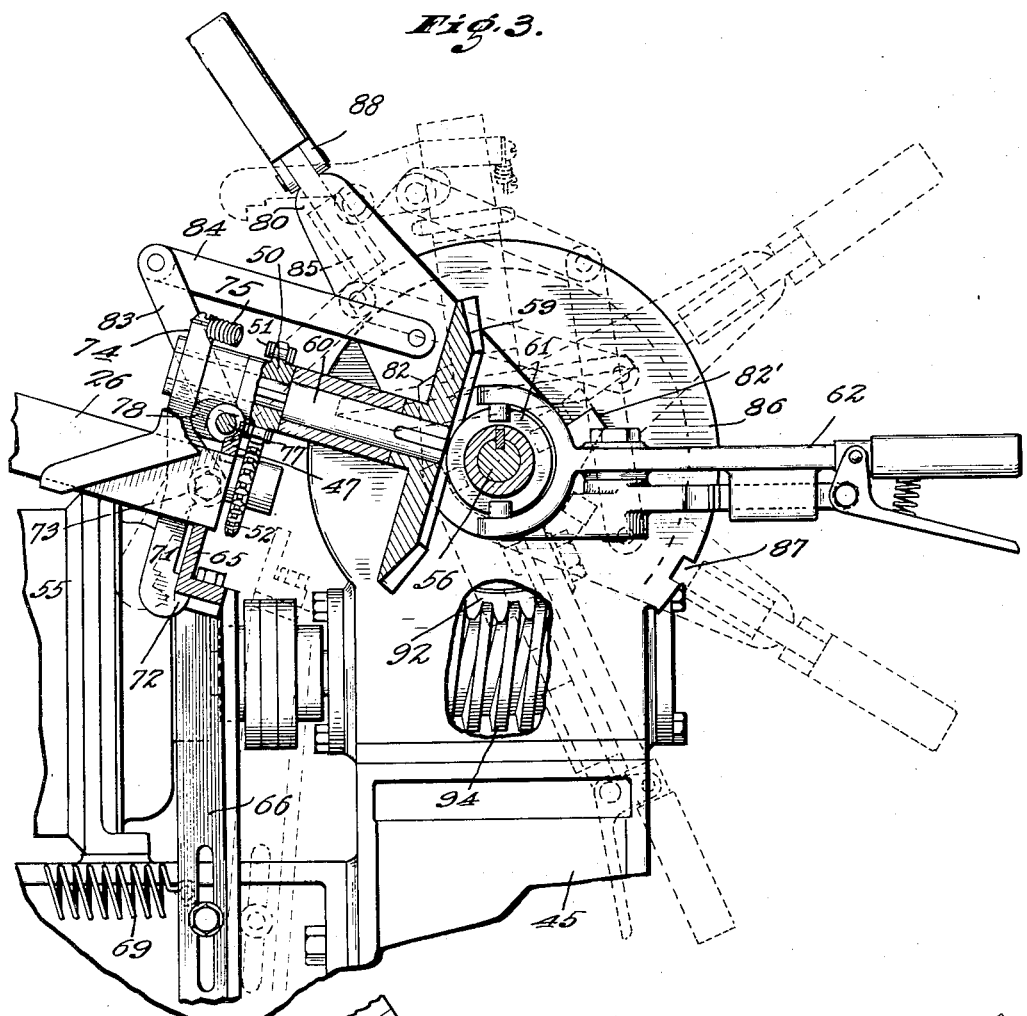
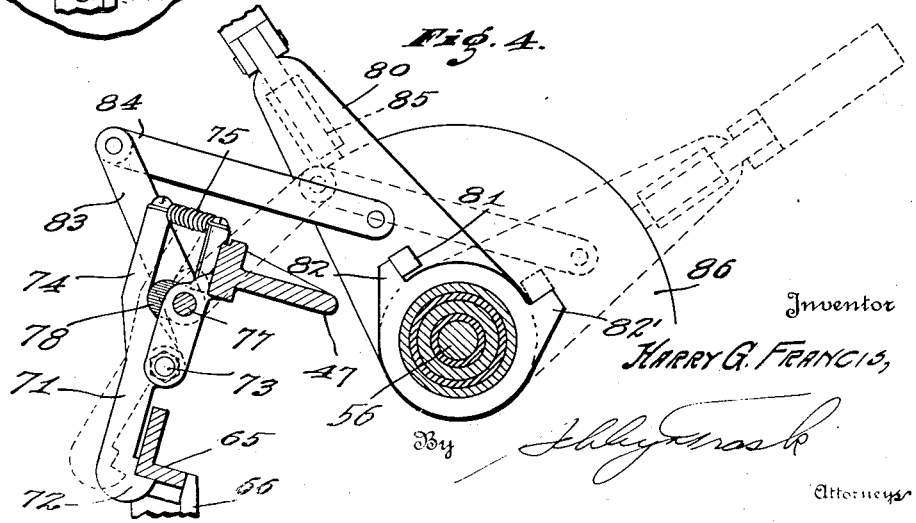

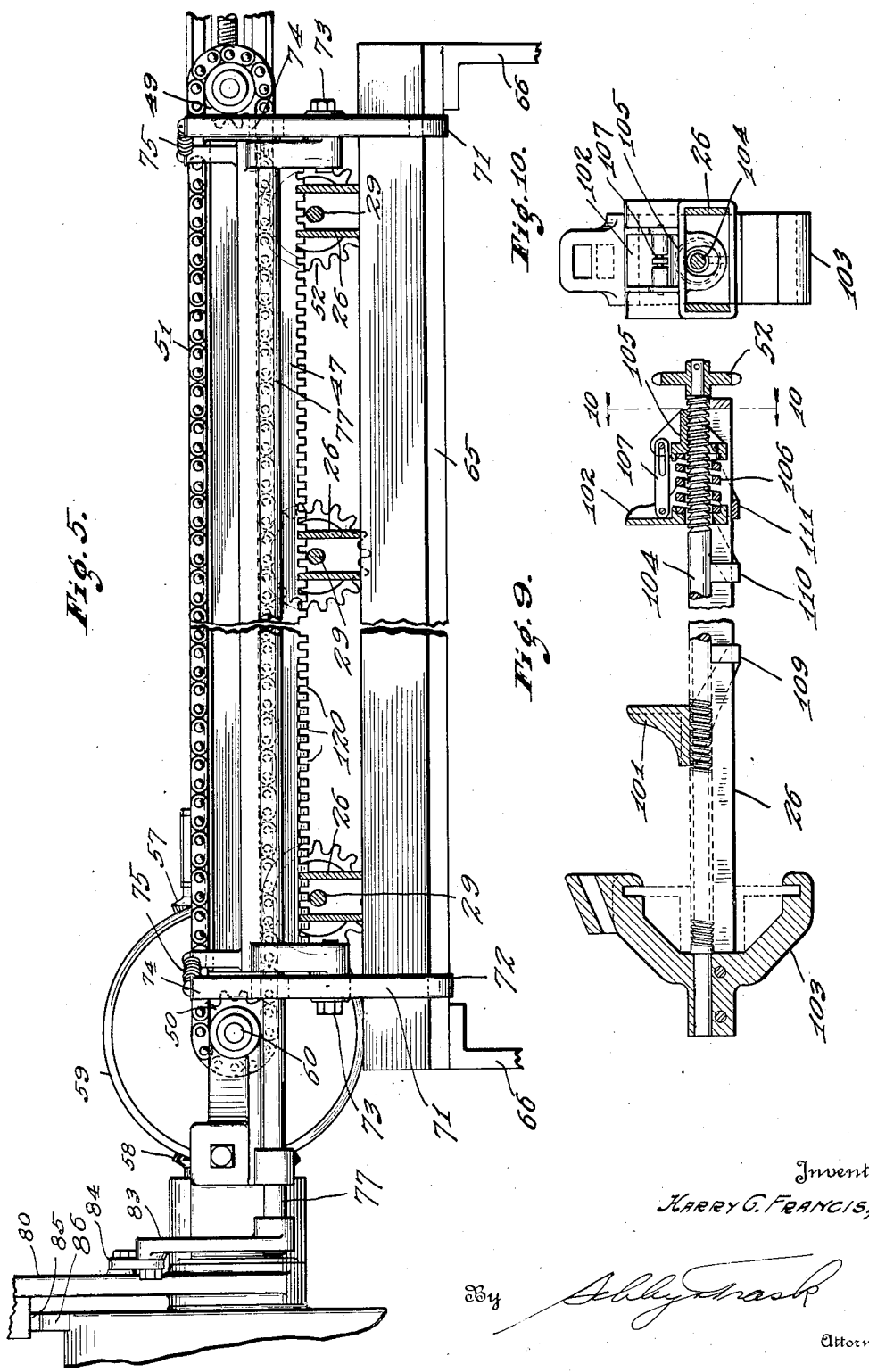

Patented Nov. 20, 1934

1,981,499

UNITED STATES PATENT OFFICE 1,981,499

CLAMP

Harry G. Francis, Rushville, Ind.

Application May 11, 1929, Serial No. 362,228

10 Claims. (Cl. 144—289)

My invention is concerned with clamp carriers or clamping machines, devices employed in manufacturing plants in the operation of gluing together pieces of wood. These clamp carriers, of which there are several different types, embody a series of groups of clamps usually carried by a rotatable drum or endless chain. Mechanism is provided for moving the drum or chain to bring the clamp groups successively to an operating station under the control of the operator. As each group of clamps reaches the operating station, the several clamps of such group are individually released, the glued work is removed, the operator inserts in the clamps a new set of boards which are to be glued together and then the clamps are tightened individually. When this operation is complete, the machine is operated to cause the next group of clamps to move to the operating station, and the transfer of work in that clamp group is effected as in the previous case. Each group of clamps after having work inserted and clamped in it, moves around the machine to be returned eventually to the operator's station, by which time the glue will have dried.

In such a machine, each group of clamps is usually comprised of a plurality of individual clamps formed of a fixed jaw, a movable jaw, a guide for the movable jaw, and a clamp screw or other means for moving the movable jaw.

It is the object of my invention to provide for a clamp machine or clamp carrier a power-driven device by means of which the several screws or other clamp-tightening means of each clamp group may be simultaneously operated. A further object of my invention is to insure that the pressure exerted by the different clamps of each group will be sustantially the same in order to produce an even clamping pressure on the work.

In carrying out my invention I provide at the operator's station a power-driven device and power-transmitting mechanism adapted to be operatively connected to the several clamp screws or other tightening means of each clamp group.

The accompanying drawings illustrate my invention: Fig. 1 is a side elevation of one end of a clamp carrier of the endless chain type; Fig. 2 is a plan view, in partial section, showing a clamp group associated with the power-driven clamp-tightening mechanism; Fig. 3 is a vertical section on the line 3—3 of Fig. 2; Fig. 4 is a vertical section on the line 4—4 of Fig. 2; Fig. 5 is an elevation of the clamp-tightening mechanism in engagement with one group of clamps; Fig. 6 is a fragmental section on the line 6—6 of Fig. 2; Fig. 7 is a longitudinal section through one clamp showing the jaws, the guide, and the clamping screw; Fig. 8 is a plan of the parts illustrated in Fig. 7; Fig. 9 is a view similar to Fig. 7 but showing a modified form of clamp; and Fig. 10 is a section on the line 10—10 of Fig. 9.

In the drawings, I have illustrated my invention as associated with a clamp carrier embodying an endless chain made up of links 15, these links being interconnected by cross-bars 16 which extend between opposite sides of the chain. The chain formed by the interconnected links 15 runs over horizontally spaced drums 17, only one of which is shown in the drawing. By rotating the drum 17 at one end of the chain, the chain may be made to move as desired. The drum 17 shown in Fig. 1 is mounted on a rotatable shaft 18 suitably supported in a frame 19 and adapted to be driven through the gearing 20, chain 21, and clutch 22, from an electric motor or other suitable source of power 23. A clutch-control lever 24 effects engagement and disengagement of the clutch 22, and by the operation of the clutch the chain can be made to move or come to rest as desired.

The clamp groups embodied in the machine illustrated are carried at spaced intervals along the chain formed by the links 15 and may be attached to the chain in any desired fashion. As shown in the drawings, each complete clamp group comprises three individual clamps, each of which embodies a jaw-supporting member 26 and clamping jaws 27 and 28. This arrangement, with one pair of jaws for each individual clamp, is customary, but is not essential to my invention. Further, the number of clamps comprising a clamp-group is likewise immaterial.

One jaw of each clamp, here shown as the jaw 27, is rigidly mounted desirably at the outer end of its associated supporting member 26; while the other jaw, here shown as jaw 28, is movable along such supporting member towards or away from the fixed jaw 27. For each clamp, there is an operating screw 29 which extends longitudinally of the supporting member 26 and which is operatively connected to the movable jaw 28.

The operative connection between the movable jaw 28 and its operating screw 29 is desirably releasable. To this end, I provide in the rear of the jaw 28 a half-nut 31 adapted to engage and cooperate with the threads of the screw 29. Pivotally secured to the half-nut 31 is a spring abutment 32, between which and the rear face of the movable jaw 28 there lies a compression spring 33. Desirably, the spring abutment 32 is connected to the jaw 28 as by means of a pin 34 which is secured to the jaw 28 and extends rearwardly therefrom through the spring 33. The rear end of the pin 34 is slidably received in the spring abutment 32 and behind such spring abutment is provided with a cross-pin 35 which engages the spring abutment 32 and limits expansion of the spring 33. The half-nut and the lower jaw 28 are provided respectively with straps 36 and 37 which extend downwardly and outwardly and pass under the supporting member 26 as is clear from Fig. 7. The thread on the screw 29 is desirably a ratchet or buttress thread.

With the construction just described, the movable jaw 28 can be grasped by the operator and moved into engagement with the edge of any work which lies between such jaw and its associated fixed jaw. During this movement, the half-nut 31 ratchets over the thread of the screw 29, the upward movement necessary for such ratcheting being provided by reason of the fact that the strap 36 bears against the lower surface of the guide 26 at a point spaced a considerable distance outward from the half-nut 31.

For the purpose of securing the supporting members or guides 26 to the chain of the clamp carrier, I may attach each supporting member to a plate 40 provided with notches adapted to receive respectively a chain cross-bar 16 and an auxiliar cross-bar 16'. A clamping finger 41 operated by a screw 42 is arranged to grip one of the cross-bars to hold the plate 40 securely in position.

At the operator's station there are two laterally spaced pedestals 45 which serve as a support for a pivotally mounted frame 47 which carries the mechanism that serves to operate simultaneously the several clamp-tightening means of each clamp-group. This mechanism may take different forms; but I prefer to provide, rotatably supported in the frame 47 on parallel axes and laterally spaced from each other, two sprockets 49 and 50 around which extends a chain 51. On the end of each of the clamp screws 29 is a chain sprocket 52 adapted to mesh with one reach of the chain 51 to be rotated thereby as the chain is moved. By providing means for rotating the sprockets 49 and 50, I am enabled to move the chain 51 to cause rotation of the several sprockets 52 and of their associated clamp screws 29.

For the purpose of rotating the sprockets 49 and 50 I provide on one of the pedestals 45 an electric motor 55 which, through mechanism to be described in detail hereinafter, drives a shaft 56 disposed co-incident with the pivotal axis of the frame 47. Mounted co-axially with the shaft 56 and rotatable relatively thereto are two bevel pinions 57 and 58 which engage at diametrically opposite points a bevel gear 59 secured to a shaft 60 which also carries the sprocket 50.

Mounted on the shaft 56 and rotatable therewith is an axially slidable clutch member 61 having in its end faces clutch teeth adapted to engage respectively corresponding clutch teeth on the adjacent faces of the pinions 57 and 58. A shifting lever 62 is arranged to move the clutch member 61 in either direction from the neutral position shown into engagement with one or the other of the pinions 57 and 58. It will be evident that by operating the shifting lever 62 the chain 51 can be caused to move in either direction or to remain at rest.

For the purpose of supporting the outer ends of the several clamps of each group when that group is in position at the operator's station, I provide a movable support comprising a horizontally disposed member 65 on which the outer ends of each clamp may rest; and at the ends of such member 65 I secure two downwardly extending legs 66 attached respectively to arms 67 of two bell cranks on the two pedestals 45. The other arms of these bell cranks are interconnected by a treadle to which the operator can apply foot-pressure to move the support 65 from the full-line to the dotted-line position shown in Fig. 3, in which latter position the support 65 is clear of the ends of the clamps and permits them to be moved from the position they occupy during the change of work. Desirably, the mounting of the legs 66 on the bell crank arms 67 is made adjustable in order that the vertical position of the support member 65 may be varied to suit conditions. A spring 69 tends normally to draw the support 65 inwardly towards operative position, from which it can be moved by the application of pressure to the treadle.

Desirably, some means is provided for holding together the support 65, the outer ends of the clamps, and the mechanism for tightening the clamp screws when the clamps are associated with such mechanism. To this end, I may provide on the frame 47 two or more swinging fingers 71 having heads 72 adapted to be engaged with the under surface of the supporting member 65 to hold the chain 51 against the sprockets 52 and to hold the clamp against the supporting member 65. The fingers 71 are pivotally mounted as upon pivot bolts or pins 73 and are provided with upwardly projecting extensions 74 between which and some point on the frame 47 there act springs 75 tending to hold the heads 72 out of engagement with the supporting member 65, or in the dotted line position indicated in Figs. 3 and 4. For the purpose of moving the fingers 71 about their axis of pivotal mounting to cause engagement of the heads 72 with the supporting member 65, I may provide a shaft 77 which extends along the frame 47 and is rotatably supported therein. On the shaft 77 I provide for each finger a cam 78 adapted to engage the finger-projections 74 and thereby to force the heads 72 from beneath the supporting member 65 as the shaft 77 is rotated.

As a means for swinging the frame 47 about its axis of pivotal mounting to bring the chain 51 into and out of engagement with the clamp-screw sprockets 52, I may provide a lever 80 which is pivotally mounted near one end of the frame 47 and is co-axial therewith. This lever is also conveniently employed to rotate the shaft 77 in order that one continuous movement of the lever 80 in one direction may cause the frame 47 to be swung to bring the chain 51 into engagement with the clamp-screw sprocket 52 and also to bring about engagement of the fingers 71 with the clamp-support 65. Movement of the lever 80 in the reverse direction will cause disengagement of the fingers 71 from the support 65 and will subsequently rotate the frame 47 to disengage the chain 51 from the sprockets 52.

To this end, the lever 80 is not directly connected to the frame 47 but is provided with a lug 81 which has a certain freedom of movement between two angularly spaced abutments 82 and 82' on the frame. The shaft 77 has rigid with it an arm 83 connected by a link 84 to the lever 80, as is clear from Fig. 4. The lost-motion between the frame 47 and the lever 80, which is provided by the angular spacing of the lugs 82 and 82', permits sufficient movement of the lever 80 to rotate the shaft 77 with its cams 78, and thereby to permit the springs 75 to move the fingers 71 out of engagement with the support 65.

When the frame 47 is in operative position as illustrated in full-lines in Fig. 3, it is held there by its own weight and by the action of the lock-fingers 71. To retain the frame 47 and the parts carried thereby in raised position, as shown in dotted lines in Fig. 3, I may provide the handle 80 with a locking pin 85 spring-pressed against a stationary flange 86. The flange 86 is provided with a depression or notch 87 into which the locking pin 85 drops when the frame 47 is raised to its inoperative position, this engagement of the locking pin in the notch serving to retain the frame 47 in raised position against the action of gravity. The lever 80 has mounted near its outer end a release finger 88 by means of which the locking pin 85 can be withdrawn from the notch 87.

I prefer that somewhere in the train of mechanism operatively interconnecting the sprocket 50 and the motor 55 there be a friction clutch adapted to slip when subjected to a predetermined maximum torque. As shown in the drawings, this friction clutch comprises a pair of friction disks 90 and 91 which receive between them the web of a worm wheel 92. At least one of the friction disks, here shown as the disk 90, is rigidly mounted on the shaft 56. In the end of the shaft 56 I provide an adjusting screw 92' which serves as an adjustable abutment for one end of a spring 93 the other end of which exerts axial pressure on the disk 91 and forces it against the web of the worm wheel 92. The worm wheel 92 meshes with a worm 94 driven from the motor 55.

In Figs. 9 and 10 I have illustrated a slightly different form of clamp. In this clamp, instead of using one fixed and one movable jaw, I provide two movable jaws 101 and 102, both of which are slidable along the guide member 26. The guide member 26 is secured at its inner end to a fitting 103 by means of which it may be attached to the chain of the clamp carrier.

The clamp screw 104 of the clamp shown in Figs. 9 and 10 has both right-hand and left-hand threads which co-operate respectively with the jaws 101 and 102. The jaw 101 co-operates directly with the screw 104, its under surface being in the form of a half-nut for this purpose. The other jaw 102, however, does not co-operate directly with the screw 104 but instead has associated with it a half-nut 105 which is located in the rear of the jaw 102 and between which and the jaw 102 there acts a compression spring 106. A slotted link 107 limits relative movement of the jaw 102 and the half-nut 105 under the influence of the spring 106.

A strap 109 extends downwardly and outwardly from the jaw 101 and passes under the guide 26 at a point spaced outwardly from the face of such jaw. With such an arrangement, it is possible to lift the jaw 101 out of engagement with the threads of the screw 104 and to move it to any desired position along the guide 26. Similar straps 110 and 111 extend downwardly and inwardly respectively from the jaw 102 and the half-nut 105, these two parts being capable of being lifted and moved freely along the guide 26.

In operation, with the frame 47 swung back to the dotted-line position shown in Figs. 3 and 4, the operator depresses the control treadle to retract the support 65 and to engage the clutch 22. The engagement of the clutch 22 causes the drum 17 to rotate to cause movement of the chain 15 and the clamp-groups carried thereby. When a clamp-group containing work which is to be removed reaches the operator's station, the control treadle is raised to release the clutch 22. Simultaneously, the support 65 is swung into the path of the outer end of the clamp group, which is then moved into contact with the support by the operator. There is sufficient slack in the mounting of the clamp bars 26 and in the chain 15 itself to permit this movement. The operator then releases the locking pin 85 from the notch 87, and permits the frame 47 to swing from the dotted line position shown in Fig. 3 to the full-line position, when the chain 50 will engage the clamp-screw sprockets 52. Continued counter-clockwise movement of the handle 80 causes the finger 71 to engage the support 65 to clamp it, the clamp bars 26, and the frame 47 together. The clutch-control lever 62 is then shifted from its neutral position to cause the chain 50 to move in a direction which will release the clamping pressure. When the clamps are released, the control lever 62 is again restored to its neutral position, and the work is removed from the clamp.

The operator then inserts in the clamp a new group of boards which are to be glued together, the engaging faces of such boards having been previously covered with glue. Should the new group of boards be of materially different width from that which has just been removed from the clamp, the movable jaws 28 can be raised from their associated clamp bars 26 and quickly moved into engagement with the edge of the work which is to be clamped. The operator then moves the control lever 62 in the opposite direction from that in which it had previously been moved to cause that movement of the chain 50 which will tighten the clamps. The control lever 62 is held in this position until the friction clutch formed by the two disks 90 and 91 and the web of the worm wheel 92 slips, whereupon the lever 62 can be restored to its neutral position. This slipping of the friction clutch provides a maximum clamping pressure and prevents injury to the machine. Should any of the movable jaws 28 engage the work before other jaws have done so, the springs 33 yield and permit such other jaws to exert their clamping action.

After the control lever 62 has been restored to its neutral position following the slipping of the friction clutch, the operator grasps the lever 80 and swings it in a clockwise direction (Fig. 3). During the initial stage of this movement, the fingers 71 are released from the support 65; and after this release is effected, continued movement of the handle 80 raises the frame 47, it being retained in raised position by reason of the engagement of the locking pin 85 in the notch 87. Thereafter, the operator depresses the operating treadle as before to bring a new clamp group into association with the clamp-operating mechanism.

To take the side thrust imposed on the outer ends of the clamp bars 26 when the chain 50 is moved, I may provide on the under surface of the frame 47 a series of notches 120 adapted to receive the upper edges of the clamp-bars 26, as is clear from Fig. 5, to prevent their lateral displacement as the result of the action of the chain 50 on the clamp-screw sprockets 52.

I claim as my invention:—

1. In combination with a clamp carrier having a series of clamps and means for moving said clamps successively to and from an operator's station, each of said clamps embodying a pair of jaws and a screw for producing relative movement of said jaws; a sprocket on the end of each of said screws, a frame at the operator's station, a pair of sprockets rotatably mounted in said frame, a chain operatively interconnecting said pair of sprockets, and means for driving said chain in either direction, said frame being movable to bring one reach of said chain into and out of engagement with the screw-sprocket of a clamp at the operator's station.

2. In combination with a clamp carrier having a series of groups of clamps and means for moving said clamp-groups to and from an operator's station, each of said clamp-groups including a plurality of individual clamps each of which has a pair of jaws and a screw for producing relative movement of said jaws, a power-receiving member for each of said clamp-screws, a rigid unitary frame at the operator's station, power-transmitting mechanism carried by said frame and adapted to engage the power-receiving members of a group of clamps at the operator's station to rotate the clamp-screws of such clamp-group, and means for driving said power-transmitting mechanism in either direction, and means supporting said frame for movement into and out of a position in which said power-transmitting mechanism engages the power-receiving members of the clamp group at the operator's station.

3. In combination with a clamp carrier having a series of groups of clamps and means for moving said clamp-groups to and from an operator's station, each of said clamp-groups including a plurality of individual clamps each of which has a pair of jaws and a screw for producing relative movement of said jaws, a power-receiving member for each of said clamp-screws, a rigid unitary frame at the operator's station, power-transmitting mechanism carried by said frame and adapted to engage the power-receiving members of a group of clamps at the operator's station to rotate the clamp-screws of such clamp-group, and means for driving said power-transmitting mechanism in either direction, means supporting said frame for movement into and out of a position in which said power-transmitting mechanism engages the power-receiving members of the clamp group at the operator's station, and means for preventing relative movement of the clamps of such clamp-group and said frame when said power-transmitting mechanism is in engagement with said power-receiving members.

4. In combination with a clamp carrier having a series of clamps and means for moving said clamps to and from an operator's station, each of said clamps comprising a pair of jaws and a clamping mechanism for moving said jaws relatively to each other, one jaw of each pair of jaws being operatively connected to its associated clamping mechanism through a yielding connection; power-driven means at the operator's station for operating the clamping mechanism of the clamp at the operator's station, said power-driven means being selectively controllable to move the jaws of said clamp either toward or away from each other.

5. In combination with a clamp carrier having a series of groups of clamps and means for moving said clamp-groups to and from an operator's station, each of said clamp-groups including a plurality of individual clamps each of which has a pair of jaws and means for moving said jaws relatively to each other, each of said jaw-moving means including a rotatable power-receiving member, the power-receiving members respectively associated with the various clamps being arranged in a row with their axes parallel, and power-driven clamp-operating means located at the operator's station, said clamp-operating means having a driven element extending parallel to the row of power-receiving members associated with a clamp-group at the operator's station, said driven element directly engaging said power-receiving members.

6. In combination with a clamp carrier having a series of groups of clamps and means for moving said clamp-groups to and from an operator's station, each of said clamp-groups including a plurality of individual clamps each of which has a pair of jaws and means for moving said jaws relatively to each other, each of said jaw-moving means including a rotatable power-receiving member, the power-receiving members respectively associated with the various clamps being arranged in a row, and power-driven clamp-operating means located at the operator's station, said clamp-operating means having a driven element extending parallel to the row of power-receiving members associated with a clamp-group at the operator's station, said driven member directly engaging said power-receiving members.

7. A device for tightening a joiner's clamp having a rotatable power-receiving member by rotation of which said clamp is operated, said device comprising a frame, a coupling element mounted on said frame and engageable with said power-receiving member, means for driving said coupling element, a movable clamp support for supporting the clamp relative to the coupling element, and releasable means carried by said frame for holding the clamp on said support.

8. A device for tightening a joiner's clamp having a rotatable power-receiving member by rotation of which said clamp is operated, said device comprising a frame, a coupling element mounted on said frame and engageable with said power-receiving member, means for driving said coupling element, a movable clamp support for supporting the clamp relative to the coupling element, and releasable means for holding the clamp on said support.

9. The invention set forth in claim 7 with the addition that said frame is movable from and into association with a clamp on said support, the device including a common operating member for moving said frame and for controlling said releasable means.

10. The invention set forth in claim 7 with the addition that said frame is movable from and into association with a clamp on said support.

HARRY G. FRANCIS.